United States Patent [19]

Stepp et al.

[11] Patent Number: 5,223,595
[45] Date of Patent: Jun. 29, 1993

[54] PROCESS FOR PREPARING ORGANO(POLY)SILOXANES

[75] Inventors: Michael Stepp; Johann Müller, both of Burghausen; Silvia Schöfberger, Reut, all of Fed. Rep. of Germany

[73] Assignee: Wacker-Chemie GmbH, Munich, Fed. Rep. of Germany

[21] Appl. No.: 872,387

[22] Filed: Apr. 23, 1992

[30] Foreign Application Priority Data

May 16, 1991 [DE] Fed. Rep. of Germany ....... 4116014

[51] Int. Cl.$^5$ ............................................. C08G 77/06
[52] U.S. Cl. ...................................... 528/14; 528/37; 556/462; 556/467
[58] Field of Search .................... 528/37, 14; 556/462, 556/467

[56] References Cited

FOREIGN PATENT DOCUMENTS 0331753 9/1989 European Pat. Off. .
1-098631 4/1989 Japan .
959144 5/1964 United Kingdom .

OTHER PUBLICATIONS

Polymer Science USSR, Bd. 26, Nr. 9, 1984, Oxford GB, Seiten 2226-2231; P. O. Prikhod'ko et al.
Chemical Abstracts, vol. 101, No. 10, Sep. 3, 1984, Columbus, Ohio, US; abstract No. 73186D, L. M. Tartakovskaya et al.
Patent Abstracts of Japan, vol. 13, No. 313 (C-618) (3661) Jul. 17, 1989 & JP-A-1 098 631 (Chisso Corp.) Apr. 17, 1989.
J. Yamawaki et al., Chemistry Letters No. 7, 1979, pp. 755-758.

Primary Examiner—Melvyn I. Marquis

[57] ABSTRACT

A process for preparing organo(poly)siloxanes of the formula $$R^1R_2Si(OSiR_2)_m(OSiR_2)_nOH$$

which comprises reacting a hexaorganocyclotrisiloxane of the formula $$(R_2SiO)_3$$

with a sil(ox)anol of the formula $$R^1R_2Si(OSiR_2)_mOH$$

in the presence of a catalyst which contains fluoride ions, in which R is the same or different and represents a monovalent, optionally substituted hydrocarbon radical, $R^1$ represents a hydrogen atom or a monovalent, optionally substituted hydrocarbon radical, m is 0 or an integer of at least 1 and n is an integer of at least 3.

An alkali metal fluoride or an alkali metal fluoride bonded to a support material is preferably used as the catalyst in the process of this invention.

10 Claims, No Drawings

PROCESS FOR PREPARING ORGANO(POLY)SILOXANES

The invention relates to a process for preparing organo(poly) siloxanes and more particularly to a process for preparing organo(poly)siloxanes having a terminal Si-bonded hydroxyl group on only one end of the molecular chain.

BACKGROUND OF THE INVENTION

The polymerization of hexaorganocyclotrisiloxane in the presence of catalytic amounts of a pentacoordinated silicon catalyst, an alkali metal siliconate, ammonium siliconate or phosphonium siliconate and at least traces of a sil(ox)anol is known from U.S. Pat. No. 3,445,426 (corresponds to DE-B 1 720 496). However, the catalyst is not readily available and is sensitive to moisture.

The polymerization of hexaorganocyclotrisiloxanes in the presence of sil(ox)anols and with the aid of alkali metal sil(ox)anolates as polymerization initiators is described in EP-A 331 753. Alkali metal sil(ox)anolates also have a sensitivity to moisture.

The polymerization of hexamethylcyclotrisiloxane in the presence of trialkylsilanol and a lithium catalyst, such as butyllithium, is known from EP-A 338 577. The use of organometallic compounds presents safety problems.

The ring-opening and polymerization of cyclic siloxanes in the presence of fluoride ions is described in L. M. Tartakovskaya et al., Vysokomol, Soedin, Ser. B 26, 234, 1984 (Chemical Abstracts Volume 101, 73186d, 1984).

Therefore, it is an object of the present invention to provide a process for preparing organo(poly)siloxanes, which avoids the disadvantages mentioned above. Another object of the present invention is to provide a process for preparing organo(poly)siloxanes which uses a catalyst that is readily available and is easy to handle.

SUMMARY OF THE INVENTION

The foregoing objects and others which will become apparent from the following description are accomplished in accordance with this invention, generally speaking, by providing a process for preparing organo(poly)siloxanes of the formula $$R^1R_2Si(OSiR_2)_m(OSiR_2)_nOH,$$

which comprises reacting hexaorganocyclotrisiloxane of the formula $$(R_2SiO)_3$$

with a sil(ox)anol of the formula $$R^1R_2Si(OSiR_2)_mOH$$

in the presence of a catalyst which contains fluoride ions, in which R is the same or different radicals and represents a monovalent hydrocarbon radical or a monovalent substituted hydrocarbon radical, $R^1$ is a hydrogen atom or a monovalent hydrocarbon radical or a monovalent substituted hydrocarbon radical, m is 0 or an integer of at least 1 and n is an integer of at least 3.

DESCRIPTION OF THE INVENTION

In the above formula R preferably represents a monovalent hydrocarbon radical having from 1 to 13 carbon atom(s) per radical or a monovalent substituted hydrocarbon radical having from 1 to 13 carbon atom(s) per radical.

Preferably $R^1$ represents a hydrogen atom or a monovalent, hydrocarbon radical having from 1 to 13 carbon atom(s) per radical or a monovalent substituted hydrocarbon radical having from 1 to 13 carbon atom(s) per radical, m is preferably 0 or an integer from 1 to 3 and n is preferably an integer of from 3 to 999, and more preferably from 9 to 30.

Examples of hydrocarbon radicals R are alkyl radicals, such as the methyl, ethyl, n-propyl, iso-propyl, n-butyl, iso-butyl, tert-butyl, n-pentyl, iso-pentyl, neopentyl and tert-pentyl radicals; hexyl radicals such as the n-hexyl radical; heptyl radicals, such as the n-heptyl radical; octyl radicals, such as the n-octyl radical and iso-octyl radicals, such as the 2,2,4-tri-methylpentyl radical; nonyl radicals, such as the n-nonyl radical; decyl radicals, such as the n-decyl radical; dodecyl radicals, such as the n-dodecyl radical; alkenyl radicals, such as the vinyl and the allyl radicals; cycloalkyl radicals, such as the cyclopentyl, cyclohexyl and cycloheptyl radicals and methylcyclohexyl radicals; aryl radicals, such as the phenyl and the naphthyl radicals; alkaryl radicals, such as o-, m- and p-tolyl radicals, xylyl radicals and ethylphenyl radicals; and aralkyl radicals, such as the benzyl radical and the α- and β-phenethyl radicals.

Examples of substituted hydrocarbon radicals are haloalkyl radicals, such as the 3,3,3-trifluoro-n-propyl radical, 2,2,2,2′, 2′,2′-hexafluoroisopropyl radical and the heptafluoroisopropyl radical; haloaryl radicals, such as the o-, m- and p-chlorophenyl radical; and acyloxyalkyl radicals, such as the acetoxyethyl radical and (meth)acryloxypropyl radical.

The examples of hydrocarbon radicals R and substituted hydrocarbon radicals R also applies to hydrocarbon radicals $R^1$ and substituted hydrocarbon radicals $R^1$.

Preferably R represents an alkyl radical, and more preferably R represents a methyl radical.

Preferably $R^1$ represents a hydrogen atom, an alkyl radical, an alkenyl radical or a substituted hydrocarbon radical, and more preferably a methyl, vinyl, allyl or (meth)acryloxypropyl radical.

Preferred examples of the organo(poly)siloxanes of this invention are those of the formula
$Me_3Si(OSiMe_2)_m(OSiMe_2)_nOH$,
$HMe_2Si(OSiMe_2)_m(OSiMe_2)_nOH$,
$(H_2C=CH)Me_2Si(OSiMe_2)_m(OSiMe_2)_nOH$,
$(H_2C=CHCH_2)Me_2Si(OSiMe_2)_m(OSiMe_2)_nOH$,
$(CF_3CH_2CH_2)Me_2Si(OSiMe_2)_m(OSiMe_2)_nOH$,
$H_2C=CHC(O)O(CH_2)_3Me_2Si(OSiMe_2)_m(OSiMe_2)_nOH$ and
$H_2C=C(Me)C(O)O(CH_2)_3Me_2Si(OSiMe_2)_m(OSiMe_2)_nOH$,
in which Me is a methyl radical and m and n are the same as above.

The organo(poly)siloxanes of this invention preferably have a viscosity of from 4 to $9 \times 10^5$ mPa.s at 25° C.

An alkali metal fluoride or an alkali metal fluoride bonded to a support material is preferably employed as the catalyst containing fluoride ions in the process of this invention.

The catalyst containing fluoride ions which is employed in the process of this invention can be an individual type or a mixture of at least two different types of such catalysts.

Examples of the alkali metal fluoride are potassium fluoride and cesium fluoride.

Examples of support materials are aluminum oxides, titanium dioxides, zeolites, silica gels, diatomaceous earths and ion exchanger resins.

An alkali metal fluoride bonded to a support material, and in particular potassium fluoride bonded to aluminum oxide, is preferably employed in the process of this invention.

The alkali metal fluoride bonded to a support material is prepared, for example, by evaporation of a mixture of aluminum oxide and potassium fluoride in water, by drying of a mixture of aluminum oxide and potassium fluoride triturated together in the dry state, or by hydrolysis of aluminum triisopropylate or titanium tetraisopropylate in the presence of potassium fluoride. Processes for the preparation of an alkali metal fluoride bonded to a carrier material are described in J. Yamawaki et al., Chemistry Letters, page 755–758, 1979, and T. Ando et al., Chemistry Letters, pages 45–46, 1979.

The process of this invention has the advantage that the catalyst employed is readily available and easy to handle, since, for example, it can be stored in air. The preparation of the organo(poly)siloxanes according to this invention using heterogeneous catalysts, that is using an alkali metal fluoride bonded to a support material, such as potassium fluoride bonded to aluminum oxide, has the further advantage that the solid catalyst can easily be removed from the reaction mixture, for example by simple filtration.

The catalyst containing fluoride ions is employed in the process of this invention in amounts of preferably from 0.01 to 1% by weight, and more preferably from 0.1 to 0.5% by weight, based on the total weight of the hexaorganocyclotrisiloxane employed. Because of the lower fluoride concentration in comparison with the corresponding alkali metal fluoride, the alkali metal fluoride fixed to the support material is employed in larger amounts.

Hexamethylcyclotrisiloxane is preferably employed as the hexaorganocyclotrisiloxane in the process of this invention.

The triorganosiloxy group on one end of the molecular chain of the organo(poly)siloxanes prepared in the process of this invention is introduced via the sil(ox)anol employed. A triorganosilanol, preferably trimethylsilanol or vinyldimethylsilanol, is preferably employed. The vinyldimethylsiloxy group or perfluoroalkyldimethylsiloxy group, for example, can be introduced via oligomeric or polymeric siloxanols on the basis of the instability of the corresponding silanols. Tetrasiloxanols are readily accessible here via reaction of a hexaorganocyclotrisiloxane with the corresponding chlorosilane (compare DE-B 2 918 312). An example of such a siloxanol is α-hydroxy-ω-vinyldimethylsiloxyhexamethyltrisiloxane.

Disiloxanes or polysiloxanes formed by condensation of the triorganosilanol employed during the reaction or during storage do not interfere with the reaction.

The ratio of hexaorganocyclotrisiloxane to sil(ox)anol employed in the process of this invention determines the average chain length of the product. The hexaorganocyclotrisiloxane is preferably employed in amounts of from 1 to 333 mols, and more preferably in amounts of from 3 to 10 mols, per mol of sil(ox)anol.

To increase the selectivity of the reaction, the process of this invention can be carried out in the presence of a polar, aprotic organic solvent, or as a mixture with a non-polar organic solvent. Examples of polar, aprotic organic solvents are acetone, dimethylformamide, dimethyl sulfoxide, acetonitrile and ethyl acetate. Examples of non-polar organic solvents are toluene and hexane.

The polar, aprotic organic solvent is preferably employed in amounts of from 0 to 50% by weight, preferably from 5 to 30% by weight, and more preferably from 5 to 20% by weight, based on the total weight of the organosilicon compounds employed, and depending on the nature of the catalyst containing fluoride ions employed.

A non-polar organic solvent can be employed in amounts of up to 80% by weight, and more preferably from 50 to 70% by weight, based on the total weight of the organosilicon compounds employed, for better homogenization of the reaction mixture.

To increase the selectivity and rate of reaction, phase transfer catalysts from the group comprising quaternary ammonium salts, such as benzyltriethylammonium chloride, crown ethers, such as 18-crown-6,1,4,7,10,13,16-hexaoxacyclooctadecane or polyethylene glycol dimethyl ether, tertiary amines, such as 4-dimethylaminopyridine, N,N-dimethylcyclohexylamine or 1,4-diazabicyclo[2,2,2]octane, and zeolites (molecular sieves) can also be used in the process of this invention.

The process of this invention is preferably carried out at a temperature above the melting point of the organosilicon compounds employed, and more preferably at a temperature of from 60° to 80° C. If organic solvents are used, it can be carried out at a lower temperature.

The process of this invention is preferably carried out under the pressure of the surrounding atmosphere, that is about 1020 hPa (absolute), but higher or lower pressures can also be used.

The reaction time in the process of this invention is preferably from 0.25 to 48 hours, depending on the reaction temperature, the nature and amount of the organosilicon compounds employed and the solvent. Interruption of the reaction at incomplete conversion is possible by cooling to room temperature and/or filtration over silica gel.

EXAMPLE 1

A mixture containing 555 g (2.5 mol) of hexamethylcyclotrisiloxane, 1500 g of toluene, 51.8 g (0.5 mol) of trimethylsilanol (industrial, contains 15 mol % of hexamethyldisiloxane), 50 g of molecular sieve 0.4 nm (commercially available from Merck) and 5 g (0.04 mol) of 4-dimethylaminopyridine (commercially available from Merck) is heated up to 40° C., and a suspension of 1.75 g (0.0077 mol) of benzyltriethylammonium chloride (commercially available from Merck) and 0.45 g (0.007 mol) of potassium fluoride in 170 ml of dimethyl sulfoxide is added. The mixture is stirred at 40° C. for 20 hours and filtered over silica gel 60 (commercially available from Merck). The filtrate is concentrated in a rotary evaporator at 30° C. and under 10 mbar and the dimethyl sulfoxide which has separated out is removed in a separating funnel. About 273 g of a clear, colorless oil are obtained, which according to the results of SFC analysis (Supercritical Fluid Chromatography, with supercritical $CO_2$) and of the $^{29}Si$ NMR spectrum, has the following average formula:

$(CH_3)_3Si[OSi(CH_3)_2]_{15}OH$.

EXAMPLE 2

A mixture containing 207.2 g (0.93 mol) of hexamethyltrisiloxane, 300 g of toluene, 9.0 g (0.1 mol) of trimethylsilanol (distilled, at least 95% pure), 10 g of molecular sieve 0.4 nm and 1 g (0.0089 mol) of 1,4-diazabicyclo[2,2,2]-octane (commercially available from Merck) is heated up to 40° C., and a suspension of 0.35 g (0.0015 mol) of benzyltriethylammonium chloride and 0.09 g (0.0015 mol) of potassium fluoride in 34 ml of dimethylsulfoxide is added. The mixture is stirred at 40° C. for 4 hours and filtered over silica gel 60. The filtrate is concentrated in a rotary evaporator at 30° C. and under 10 mbar and the dimethylsulfoxide which has separated out is removed in a separating funnel. About 160 g of an organopolysiloxane are obtained, which according to the SFC analysis and the $^{29}Si$-NMR spectrum has the average formula $(CH_3)_3Si[OSi(CH_3)_2]_{28}OH$.

EXAMPLE 3

The procedure of Example 2 is repeated, except that 111 g (0.5 mol) of hexamethylcyclotrisiloxane are employed instead of 207.2 g of hexamethylcyclotrisiloxane and 2 g (0.017 mol) of 1,4-diazabicyclo[2,2,2]octane are employed instead of 1 g of 1,4-diazabicyclo[2,2,2]octane. About 97 g of an organopolysiloxane having the average formula:

$(CH_3)_3Si[OSi(CH_3)_2]_{15}OH$ are obtained.

EXAMPLE 4

The procedure of Example 3 is repeated, except that the 1,4-diazabicyclo[2,2,2]octane is omitted. About 88 g of an oil are obtained having the average formula $(CH_3)_3Si[OSi(CH_3)_2]_{15}OH$ which, according to SFC analysis, contains as a secondary constituent 5% by weight of a trimethylsiloxy endblocked dimethylpolysiloxane of the formula $(CH_3)_3Si[OSi(CH_2)_2]_{15}OSi(CH_3)_3$ and 5% by weight of an α,ω-dihydroxydimethylpolysiloxane $(H[OSi(CH_3)_2]_{15}OH)$.

EXAMPLE 5

The procedure of Example 3 is repeated, except that 1 g (0.0078 mol) of N,N-dimethylcyclohexylamine is employed instead of 2 g of 1,4-diazabicyclo[2,2,2]octane. An organopolysiloxane having the average formula of Example 3 is obtained.

EXAMPLE 6

A suspension containing 0.35 g (0.0015 mol) of benzyltriethylammonium chloride, 0.09 g (0.0015 mol) of potassium fluoride and 8 g of acetonitrile is added to a mixture containing 111 g (0.5 mol) of hexamethylcyclotrisiloxane and 9.0 g (0.1 mol) of trimethylsilanol (distilled, at least 95% pure) at 60° C., and the mixture is stirred at 60° C. for 4 hours and then at 80° C. for 2 hours. After filtration over silica gel 60, volatile constituents are removed in a rotary evaporator at 30° C. and under 10 mbar. About 87 g of an oil having the average formula $(CH_3)_3Si[OSi(CH_3)_2]_{15}OH$ are obtained.

EXAMPLE 7

A suspension containing 0.1 g (0.0007 mol) of cesium fluoride (commercially available from Riedel-de-Haen) and 8 g of acetonitrile is added to a mixture containing 111 g (0.5 mol) of hexamethylcyclotrisiloxane and 9.0 g (0.1 mol) of trimethylsilanol (distilled, at least 95% pure) at 60° C. The mixture is stirred at 60° C. for 15 minutes, cooled and filtered over silica gel 60, and the volatile constituents are removed in a rotary evaporator at 30° C. and under 10 mbar. About 96 g of an oil remain as a residue, which based on the SFC analysis and the $^{29}Si$-NMR spectrum has the average formula $(CH_3)_3Si[OSi(CH_3)_2]_{15}OH$.

EXAMPLE 8

(a) A mixture containing 10 g of potassium fluoride, 15 g of neutral aluminum oxide (90 mesh, neutral, activity grade 1) and 200 ml of water is evaporated to dryness. About 25 g of a white powder (referred to below as $KF/Al_2O_3$) are obtained.

(b) A mixture containing 111 g (0.5 mol) of hexamethylcyclotrisiloxane and 9.0 g (0.1 mol) of trimethylsilanol (distilled, at least 95% pure) is mixed at 60° C. with 0.5 g of the support-immobilized fluoride catalyst $KF/Al_2O_3$ whose preparation is described in (a) above, and 23.2 g of acetone. The resultant mixture is stirred at 60° C. for 1 hour. After filtration over silica gel 60 and removal of the solvent in a rotary evaporator at 30° C. and 10 mbar, 102 g of a clear, colorless oil remain which according to the SFC analysis and the $^{29}Si$-NMR spectrum has the average formula $(CH_3)_3Si[OSi(CH_3)_2]_{15}OH$.

EXAMPLE 9

The procedure of Example 8 is repeated, except that the support-immobilized fluoride catalyst $KF/Al_2O_3$ is stored in air for 24 hours at room temperature before use and the mixture is stirred for 2 hours at 60° C. after the catalyst has been added. The same siloxane having the same selectivity is obtained as in Example 8.

EXAMPLE 10

About 0.1 g (0.0007 mol) of cesium fluoride and 23.2 g of acetone are added to a mixture containing 111 g (0.5 mol) of hexamethylcyclotrisiloxane and 32.4 g of a siloxanol of the formula $(H_2C=CH)(CH_3)_2Si[OSi(CH_3)_2]_3OH$ (prepared according to DE-B 2 918 312 by reaction of hexamethylcyclotrisiloxane with vinyldimethylchlorosilane and subsequent hydrolysis of the monochlorine compound) at 60° C., and the mixture is stirred at 60° C. for one hour. After filtration over silica gel 60 and concentration of the filtrate in a rotary evaporator at 30° C. and under 10 mbar, 112 g of a liquid organopolysiloxane remain, which according to the SFC analysis, the $^1$H-NMR spectrum and the $^{29}$Si-NMR spectrum has the following formula $(H_2C=CH)(CH_3)_2Si[OSi(CH_3)_2]_{18}OH$

EXAMPLE 11

About 0.08 g (0.00056 mol) of cesium fluoride is added to a mixture containing 89 g (0.4 mol) of hexamethylcyclotrisiloxane and 26 g (0.08 mol) of a siloxanol of the formula $(H_2C=CH)(CH_3)_2Si[OSi(CH_3)_2]_3OH$ at 80° C., and the mixture is stirred at 80° C. for one hour and then at 100° C. for one hour. After filtration over silica gel 60, 110 g of a clear oil having the average formula $(H_2C=CH)(CH_3)_2Si[OSi(CH_3)_2]_{18}OH$ are obtained, which contains according to SFC analysis, 7.5% by weight of a vinyl endblocked dimethylpolysiloxane $((H_2C=CH)(CH_3)_2Si[OSi(CH_3)_2]_{18}OSi(CH_3)_2(CH=CH_2))$ and 7.5% by weight of an α,ω-dihydroxydimethylpolysiloxane $(H[OSi(CH_3)_2]_{18}OH)$, as a secondary constituent.

EXAMPLE 12

(a) About 7.2 g (0.4 mol) of water are added to a mixture containing 200 g (3.3 mol) of isopropanol, 20.4 g (0.1 mol) of aluminum triisopropylate (commercially available from Merck) and 4.1 g (0.12 mol) of potassium fluoride over a period of 30 minutes. The mixture is boiled under reflux for one hour, the volatile constituents are stripped off in vacuo and the white solid residue is dried to constant weight in a drying cabinet. The yield is 9.2 g, corresponding to 100% of theory, based on the theoretical formula $KF-Al_2O_3$.

(b) About 0.5 g of the fluoride catalyst fixed to a support, the preparation of which is described in (a) above, and 23.2 g of acetone are added to a mixture of 111 g (0.5 mol) of hexamethylcyclotrisiloxane and 11.4 g (0.07 mol) of trimethylsilanol (industrial, contains 45% by weight of hexamethyldisiloxane) at 60° C., and the mixture is stirred at 60° C. for one hour and at 68° C. for an additional two hours under reflux. After filtering over silica gel 60 and stripping off all the volatile constituents in a rotary evaporator at 30° C. and under 10 mbar, 100 g of a colorless, clear oil remain, which according to the SFC analysis and the $^{29}$Si-NMR spectrum has the average formula $(CH_3)_3Si[OSi(CH_3)_2]_{22}OH$.

EXAMPLE 13

(a) About 5 g of potassium fluoride and 7.5 g of neutral aluminum oxide (90-active, neutral, activity level 1) are mixed in a grinding dish. The mixture is dried to constant weight in a drying cabinet. About 12.5 g of a white powder $KF-Al_2O_3$ are obtained.

(b) About 0.5 g of the fluoride catalyst $KF-Al_2O_3$ fixed to a support, the preparation of which is described in (a) above, and 23.2 g of acetone are added to a mixture containing 111 g (0.5 mol) of hexamethylcyclotrisiloxane and 11.4 g (0.1 mol) of trimethylsilanol (80% pure, industrial, dried with molecular sieve 4A, contains about 20% of hexamethyldisiloxane) at 60° C., and the mixture is stirred at 60° C. for 2 hours. After filtering over silica gel 60 and stripping off the solvent in a rotary evaporator at 30° C. under 10 mbar, 100 g of a clear, colorless oil remain, which according to the SFC analysis and the $^{29}$Si-NMR spectrum has the average formula $(CH_3)_3Si[OSi(CH_3)_2]_{15}OH$.

EXAMPLE 14

(a) About 7.2 g (0.4 mol) of water are added to a mixture containing 200 g (3.3 mol) of isopropanol, 28.4 g (0.1 mol) of titanium tetraisopropylate and 5.8 g (0.1 mol) of potassium fluoride at 20° C., and the mixture is heated at 80° C. for 1.5 hours. The volatile constituents are removed at 50° C. under 10 mbar and the residue is dried to constant weight in a drying cabinet. About 9.8 g of a white solid $KF-TiO_2$ are obtained.

(b) About 0.5 g of the fluoride catalyst fixed to a support, the preparation of which is described in (a) above, and 23.2 g of acetone are added to a mixture containing 111 g (0.5 mol) of hexamethylcyclotrisiloxane and 11.4 g (0.07 mol) of trimethylsilanol (80% pure, industrial, dried with molecular sieve 4 Å, contains about 20% by weight of hexamethyldisiloxane) at 60° C., and the mixture is stirred at 68° C. for 3 hours. After filtering over silica gel 60 and stripping off all the volatile constituents in a rotary evaporator at 30° C. and under 10 mbar, 91 g of a colorless, clear oil, remain, which according to the SFC analysis and the $^{29}$Si-NMR spectrum has the average formula $(CH_3)_3Si[OSi(CH_3)_2]_{15}OH$.

What is claimed is:

1. A process for preparing an organo(poly)siloxane of the formula $R^1R_2Si(OSiR_2)_m(OSiR_2)_nOH$ which comprises reacting a hexaorganocyclotrisiloxane of the formula $(R_2SiO)_3$ with a sil(ox)anol of the formula $R^1R_2Si(OSiR_2)_mOH$ in the presence of an alkali metal fluoride catalyst, in which R is a radical selected from the group consisting of a monovalent hydrocarbon radical and a monovalent substituted hydrocarbon radical, $R^1$ is selected from the group consisting of a hydrogen atom, a monovalent hydrocarbon radical and a monovalent substituted hydrocarbon radical, m is 0 or an integer of at least 1 and n is an integer of at least 3.

2. The process of claim 1, wherein the catalyst is an alkali metal fluoride bonded to a support material.

3. The process of claim 2, wherein the catalyst is potassium fluoride bonded to aluminum oxide.

4. The process of claim 1, wherein the reaction is conducted in the presence of a polar, aprotic organic solvent.

5. The process of claim 1, wherein the reaction is conducted in the presence of a polar, aprotic organic solvent and a non-polar organic solvent.

6. The process of claim 1, wherein the hexaorganocyclotrisiloxane is employed in an amount of from 1 to 333 mols per mol of sil(ox)anol.

7. The process of claim 1, wherein the alkali metal fluoride catalyst is employed in an amount of from 0.01 to 1% by weight, based on the total weight of the hexaorganocyclotrisiloxane.

8. The process of claim 1, wherein the hexaorganocyclotrisiloxane is hexamethylcyclotrisiloxane.

9. The process of claim 1, wherein the sil(ox)anol is selected from the group consisting of trimethylsilanol and vinyldimethylsilanol.

10. The process of claim 1, wherein the sil(ox)anol is a siloxanol of the formula $(H_2C=CH)(CH_3)_2Si[OSi(CH_3)_2]_3OH.$

* * * * *